C. G. JOHNSON AND J. M. ALLEN.
MOISTURE INLET VALVE FOR INTERNAL COMBUSTION ENGINES.
APPLICATION FILED AUG. 28, 1916.

1,356,370.

Patented Oct. 19, 1920.

Inventors:-
Charles G Johnson
James M Allen

UNITED STATES PATENT OFFICE.

CHARLES G. JOHNSON AND JAMES M. ALLEN, OF ST. LOUIS, MISSOURI; SAID ALLEN ASSIGNOR OF HIS RIGHT TO HARRY D. WENTZ, OF ST. LOUIS, MISSOURI.

MOISTURE-INLET VALVE FOR INTERNAL-COMBUSTION ENGINES.

1,356,370.   Specification of Letters Patent.   Patented Oct. 19, 1920.

Application filed August 28, 1916. Serial No. 117,213.

*To all whom it may concern:*

Be it known that we, CHARLES G. JOHNSON and JAMES M. ALLEN, citizens of the United States, residing in St. Louis, Missouri, have invented certain new and useful Improvements in Moisture-Inlet Valves for Internal-Combustion Engines, of which the following is a full, clear, and exact description, reference being had to the drawings forming a part of this application.

Our invention relates to a device in the nature of a valve which is located between a source of water supply and an internal combustion engine, said valve being adapted to be opened during the suction stroke of the engine in order to permit a certain amount of water to enter the combustion chamber within the engine, which water is immediately vaporized and in such condition mixes with the hydro-carbon vapor to form an explosive charge which, under combustion, develops great power with very little, if any, resultant carbon.

The principal objects of our invention are to provide a comparatively simple, inexpensive device which can be readily used in connection with all forms of internal combustion engines, said device being wholly automatic in operation, capable of being easily and quickly adjusted so as to regulate the amount of water delivered to the engine on each suction stroke, and said device being very effective in use.

With the foregoing and other objects in view, our invention consists in certain novel features of construction and arrangement of parts which will be hereinafter more fully set forth, pointed out in the claim and illustrated in the accompanying drawings, in which:

Figure 1:
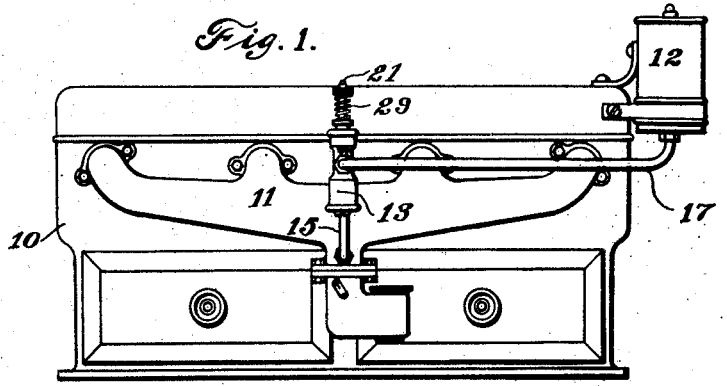
Figure 1 is an elevational view of an internal combustion engine such as is generally used on motor vehicles, and which engine is equipped with a valve of our improved construction.
Figure 2:
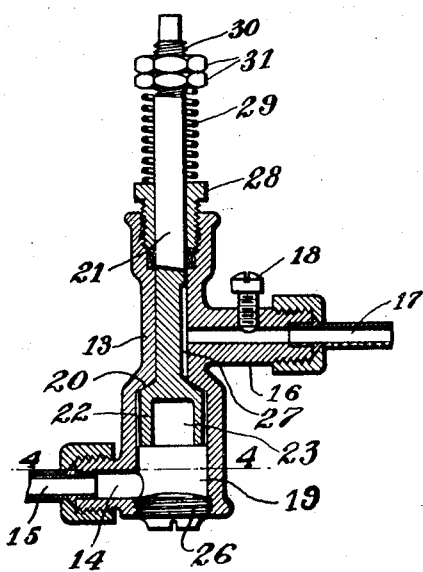
Fig. 2 is a vertical section taken through the center of our improved valve.
Figures 3, 4:
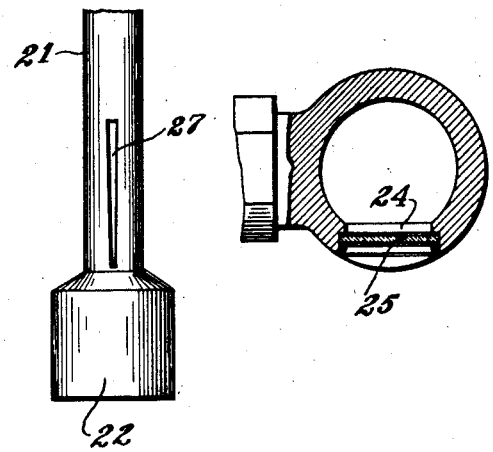
Fig. 3 is an elevational view of a portion of the valve and valve stem and showing the water inlet slot in the latter.
Fig. 4 is an enlarged horizontal section taken on the line 4—4 of Fig. 2.

Referring by numerals to the accompanying drawings, 10 designates the engine, 11 the inlet manifold thereof, and 12 a water tank which is located adjacent to the engine.

Our improved device comprises a substantially tubular body or housing 13 provided near its lower end with an outlet 14, the same being connected in any suitable manner to the manifold 11 preferably by means of a tube 15. Formed integral with the upper portion of the body 13 is a short tubular extension 16 and leading therefrom to the tank 12 is a pipe 17. Tubular extension 16 is provided with a suitable valve 18 preferably in the form of a screw which when adjusted controls the size of the passageway through said extension and, consequently, regulating the amount of water which passes therethrough.

The lower portion of housing 13 is provided with a chamber 19 and formed between said chamber and the opening through the upper portion of said housing is an annular valve seat 20. Fitting snugly within the upper portion of housing 13 and adapted to slide therethrough is a valve stem 21 the lower end of which carries a valve 22 the upper edge of which is formed so as to fit snugly upon valve seat 20. Formed through the wall of the lower portion of housing 13 is an opening 24, the same being normally closed by a small disk of glass 25, or other transparent material, this construction permitting ready inspection of the interior of chamber 19. The bottom of chamber 19 is closed by a screw plug 26, the same being seated in the lower end of housing 13. Formed in the stem 21 is a vertically disposed groove 27 the same tapering gradually toward its lower end and said lower end terminating at a point slightly above the shoulder between the valve 22 and said stem. A gland or packing nut 28 is seated in the upper end of housing 13 and valve stem 21 passes upward through said gland and the upwardly projecting portion of said stem receives a compression spring 29. The upper portion of the valve stem is threaded, as designated by 30, and seated on said threaded portion is one or more nuts 31 against which the upper end of spring 29 engages. By manipulating these nuts the tension of spring 29 can be regulated.

Under normal conditions spring 29 holds valve 22 against seat 20, and with the parts so positioned water is prevented from passing through tube 17 and tubular extension 16 downwardly through tapered groove 27 into chamber 19. Upon each suction stroke of the engine with which the device is associated the partial vacuum created within chamber 19 will act to draw valve 22 downward thereby moving the same away from seat 20 and as soon as this action takes place the lower end of tapered groove 27 will communicate with the upper portion of chamber 19 thereby permitting a certain amount of water to pass from the tank through tube 17 and tubular extension 16, and this water will pass through groove 27 into chamber 19 and from thence through outlet 14 and tube 15 into the manifold and from thence into the combustion chamber within the engine. The water thus passing into the combustion chamber will be vaporized and in such condition will mix with the hydro-carbon vapor to form an explosive charge which is very powerful and effective.

We have demonstrated in practice that a small per cent. of moisture or vaporized water introduced into the combustion chamber of an internal combustion engine tends to eliminate practically all of the carbon deposit which usually occurs in engines utilizing liquid hydro-carbon as fuel, and for this reason our device is instrumental in materially increasing the efficiency of engines with which it is combined.

The groove 27 gradually tapers in width toward its lower end so that as the valve and stem are drawn downward the space through which the water passes from tubular extension 16 to chamber 19, proportionately increases with the degree of downward movement of said valve with the result that the amount of water flowing through the groove 27 past the open valve is proportional to the degree of partial vacuum created during the suction stroke of the piston.

As hereinbefore stated the tension of spring 29 can be regulated by manipulating nut 31 and the flow of water through tubular extension 16 is regulated by adjusting screw or valve 18.

A device of our improved construction is comparatively simple, is applicable for use in connection with all types of internal combustion engines, materially increases the efficiency of engines with which it is associated, and is effective in eliminating the formation of carbon within the combustion chambers of the engine.

We claim—

A device of the class described comprising a substantially tubular valve body in the lower portion of which is formed an enlarged chamber, an outlet near the lower end of said body, a tubular inlet projecting laterally from the upper portion of said body, there being a valve seat in the valve body at the upper end of said enlarged chamber, a valve adapted to normally rest on the valve seat, a stem for said valve, which stem extends through the housing, a spring on said stem outside the housing and adapted to resist inward movement of the stem and valve, means for regulating the tension of the spring, adjustable means for regulating flow through the tubular inlet, there being a tapered groove formed in the valve stem above the valve for proportionately regulating flow through the valve, there being an opening formed through the wall of the valve body near the lower end thereof adjacent to the outlet from said valve body and a section of transparent material positioned in said opening.

In testimony whereof we hereunto affix our signatures this 24th day of August, 1916.

CHARLES G. JOHNSON.
JAMES M. ALLEN.